US011076698B2

(12) United States Patent
Munechika et al.

(10) Patent No.: US 11,076,698 B2
(45) Date of Patent: Aug. 3, 2021

(54) SEAT DEVICE

(71) Applicants: TOYOTA JIDOSHA KABUSHIKI KAISHA, Aichi-ken (JP); TOYOTA BOSHOKU KABUSHIKI KAISHA, Aichi-ken (JP); AISIN SEIKI KABUSHIKI KAISHA, Aichi-ken (JP)

(72) Inventors: Junichi Munechika, Miyoshi (JP); Norie Umehara, Toyota (JP); Tomokazu Seki, Kariya (JP); Ryosuke Mizuno, Kariya (JP); Yuki Fujii, Kariya (JP); Tomoko Kanbara, Kariya (JP)

(73) Assignees: TOYOTA JIDOSHA KABUSHIKI KAISHA, Aichi-Ken (JP); TOYOTA BOSHOKU KABUSHIKI KAISHA, Aichi-Ken (JP); AISIN SEIKI KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/775,274

(22) Filed: Jan. 29, 2020

(65) Prior Publication Data
US 2020/0245770 A1   Aug. 6, 2020

(30) Foreign Application Priority Data

Jan. 31, 2019   (JP) .............................. JP2019-015246

(51) Int. Cl.
*A47C 7/46* (2006.01)
*B60N 2/64* (2006.01)
(Continued)

(52) U.S. Cl.
CPC .............. *A47C 7/467* (2013.01); *B60N 2/646* (2013.01); *B60N 2/665* (2015.04); *B60N 2/914* (2018.02);
(Continued)

(58) Field of Classification Search
CPC ..... A47C 7/467; A47C 23/047; A47C 27/128; A47C 27/18; B60N 2/665; B60N 2/914; B60N 2/7082
See application file for complete search history.

(56) References Cited

U.S. PATENT DOCUMENTS 4,589,695 A * 5/1986 Isono ...................... A47C 7/467
297/284.9
5,105,488 A * 4/1992 Hutchinson .......... A47C 23/047
5/614
(Continued)

FOREIGN PATENT DOCUMENTS

JP          2017-13763 A      1/2017

*Primary Examiner* — Syed A Islam
(74) *Attorney, Agent, or Firm* — Hauptman Ham, LLP

(57) ABSTRACT

A seat device includes a seat cushion where a sitting person is seated, and a seatback configured to support the upper body of the sitting person. The seatback includes a seatback frame, a seatback pad placed on a front face of the seatback frame, and a seatback cover covering a surface of the seatback pad. A plurality of stretch airbags is provided in a part of the seatback at a position corresponding to the lumbar part of the sitting person, and the stretch airbags are configured to inflate and press a surface of the seatback to a direction approaching the sitting person. The stretch airbags are placed to overlap each other in a thickness direction of the seatback such that the seatback pad is sandwiched between the stretch airbags.

3 Claims, 5 Drawing Sheets

(51) Int. Cl.
  *B60N 2/66* (2006.01)
  *B60N 2/90* (2018.01)
  *A47C 27/12* (2006.01)
  *B60N 2/70* (2006.01)
  *A47C 23/047* (2006.01)
  *A47C 27/18* (2006.01)

(52) U.S. Cl.
  CPC .......... *A47C 23/047* (2013.01); *A47C 27/128* (2013.01); *A47C 27/18* (2013.01); *B60N 2/7082* (2013.01)

(56) References Cited

U.S. PATENT DOCUMENTS

| | | | | | |
|---|---|---|---|---|---|
| 5,135,282 | A | * | 8/1992 | Pappers | ................ B60N 2/914 297/284.3 |
| 5,280,997 | A | * | 1/1994 | Andres | ................ A47C 7/467 297/284.9 |
| 6,129,419 | A | * | 10/2000 | Neale | ....................... B60N 2/58 297/284.4 |
| 8,459,690 | B2 | * | 6/2013 | Breuninger | ......... B60R 21/2338 280/730.2 |
| 8,474,862 | B2 | * | 7/2013 | Pursche | ............... B60R 21/268 280/730.2 |
| 9,682,640 | B2 | * | 6/2017 | Dry | ........................... B60N 2/22 |
| 9,896,003 | B2 | * | 2/2018 | Tamura | ................. B60N 2/914 |
| 2017/0008480 | A1 | | 1/2017 | Ohno | |
| 2018/0170230 | A1 | * | 6/2018 | Onuma | ............... B60N 2/0244 |

\* cited by examiner

SEAT DEVICE

CROSS-REFERENCE TO RELATED APPLICATION

This application claims priority to Japanese Patent Application No. 2019-015246 filed on Jan. 31, 2019, incorporated herein by reference in its entirety.

BACKGROUND

1. Technical Field

The present specification discloses a seat device including a seat cushion where a sitting person is seated, and a seatback configured to support the upper body of the sitting person.

2. Description of Related Art

There have been widely known seat devices each including a seat cushion where a sitting person is seated, and a seatback configured to support the upper body of the sitting person. Some of the seat devices are configured such that a surface shape of the seatback is deformable so that the seatback follows the build of a sitting person or a moderate stimulus is given to a sitting person.

For example, Japanese Unexamined Patent Application Publication No. 2017-013763 (JP 2017-013763 A) discloses a seat device to be provided in a vehicle and configured such that an inflatable and deflatable airbag is placed in a part of a seatback, the part being configured to support the lumbar part of a sitting person. In JP 2017-013763 A, gas is introduced into the airbag so that a surface of the seatback locally projects forward. As the airbag inflates due to the introduction of the gas, the surface of the seatback is locally pressed forward. With the technology described in JP 2017-013763 A, the surface shape of the seatback can be freely deformed to some extent.

SUMMARY

However, in the technology of JP 2017-013763 A, a plurality of airbags is placed dispersedly such that the airbags do not overlap each other in their thickness direction. In this case, a forward pressing stroke of the seatback depends on thicknesses of the airbags when the airbags are inflated. On that account, it is naturally necessary to use large airbags to secure a large stroke. However, in a case where the size of the airbags is increased, it may take a longer air injecting time until the airbags are completely inflated, and eventually, it may take a longer time until the seatback is deformed. Further, in a case where large airbags are used, a large space is required to mount the airbags.

In view of this, the present specification discloses a seat device that can reduce a mounting space for airbags or an air injecting time while a sufficient deformation stroke is secured.

A seat device disclosed in the present specification is a seat device including a seat cushion and a seatback. The seat cushion is configured such that a sitting person is seated in the seat cushion. The seatback is configured to support the upper body of the sitting person. The seatback includes a seatback frame, a seatback pad placed on a front face of the seatback frame, and a seatback cover configured to cover a surface of the seatback pad. A plurality of stretch airbags is provided in a part of the seatback at a position corresponding to the lumbar part of the sitting person, and the stretch airbags are configured to inflate and press a surface of the seatback to a direction approaching the sitting person. The stretch airbags are placed to overlap each other in a thickness direction of the seatback such that the seatback pad is sandwiched between the stretch airbags.

As the stretch airbags are placed to overlap each other in the thickness direction, it is possible to secure a sufficient deformation stroke even when each of the stretch airbags is small. Since the stretch airbags have a small size, it is possible to reduce an air injecting time and a mounting space for the stretch airbags. As a result, while a sufficient deformation stroke is secured, it is possible to reduce the mounting space and the air injecting time.

Further, the stretch airbags may be further provided at positions corresponding to shoulders of the sitting person.

With such a configuration, it is possible to stretch out muscles around the shoulders in addition to the lumbar part, thereby making it possible to further improve comfortability for the sitting person.

Further, one or more refreshment airbags may be further provided at the position corresponding to the lumbar part, and the one or more refreshment airbags may be smaller than the stretch airbags. At least one of the stretch airbags may be disposed on a front face side from the refreshment airbags.

The refreshment airbags may be disposed between the seatback pad and a cover pad. Recessed portions in which the refreshment airbags are accommodated may be formed on the surface of the seatback pad.

With the seat device disclosed in the present specification, while a sufficient deformation stroke is secured, it is possible to reduce the mounting space and the air injecting time. Further, since the seatback pad is provided between the stretch airbags overlapping each other in the thickness direction, it is possible to prevent friction between the stretch airbags.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
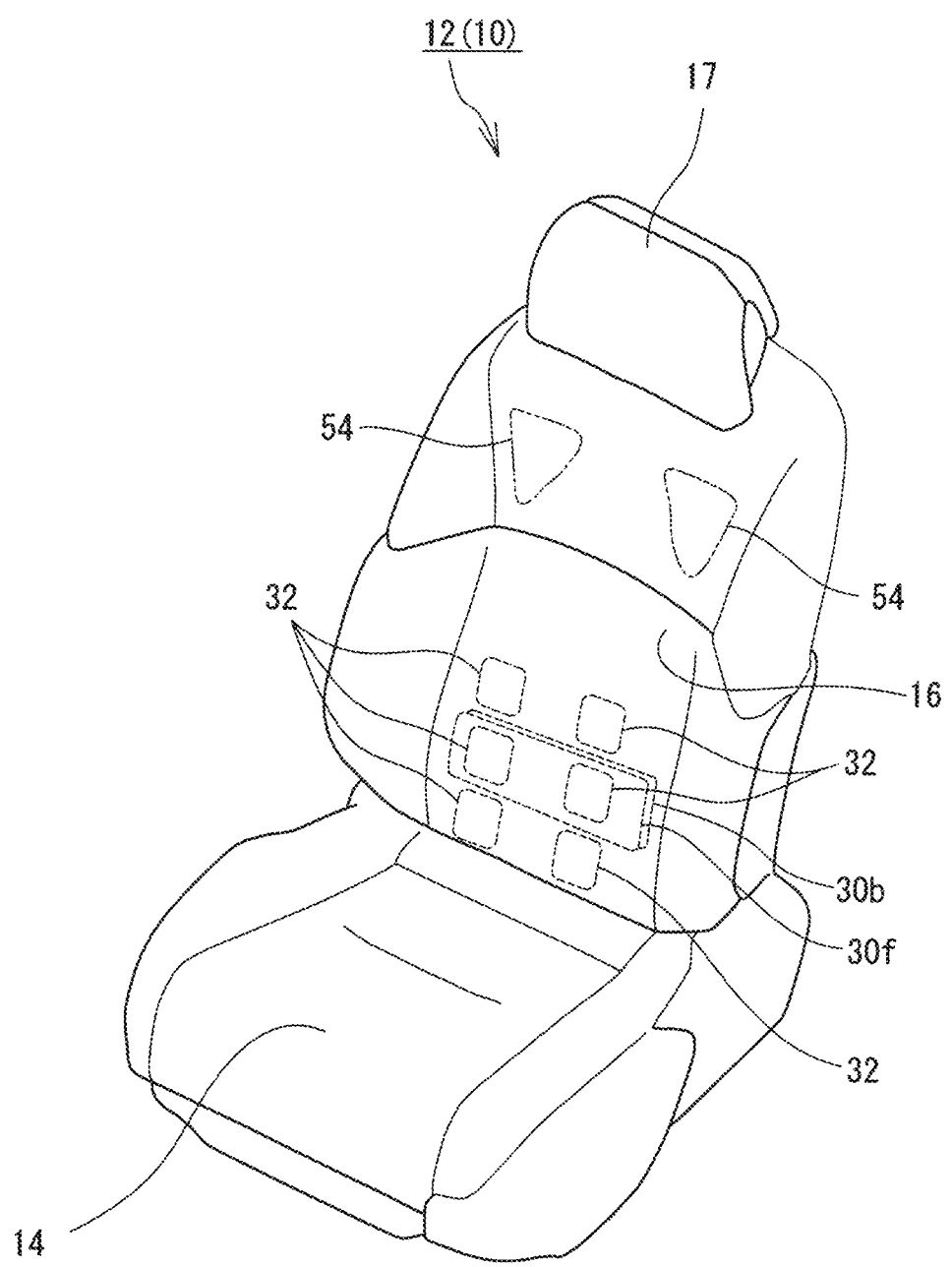
FIG. 1 is a perspective view of a seat provided in a seat device.

With reference to drawings, the following describes a configuration of a seat device 10. FIG. 1 is a perspective view of a seat 12 to be provided in the seat device 10.

Figure 2:
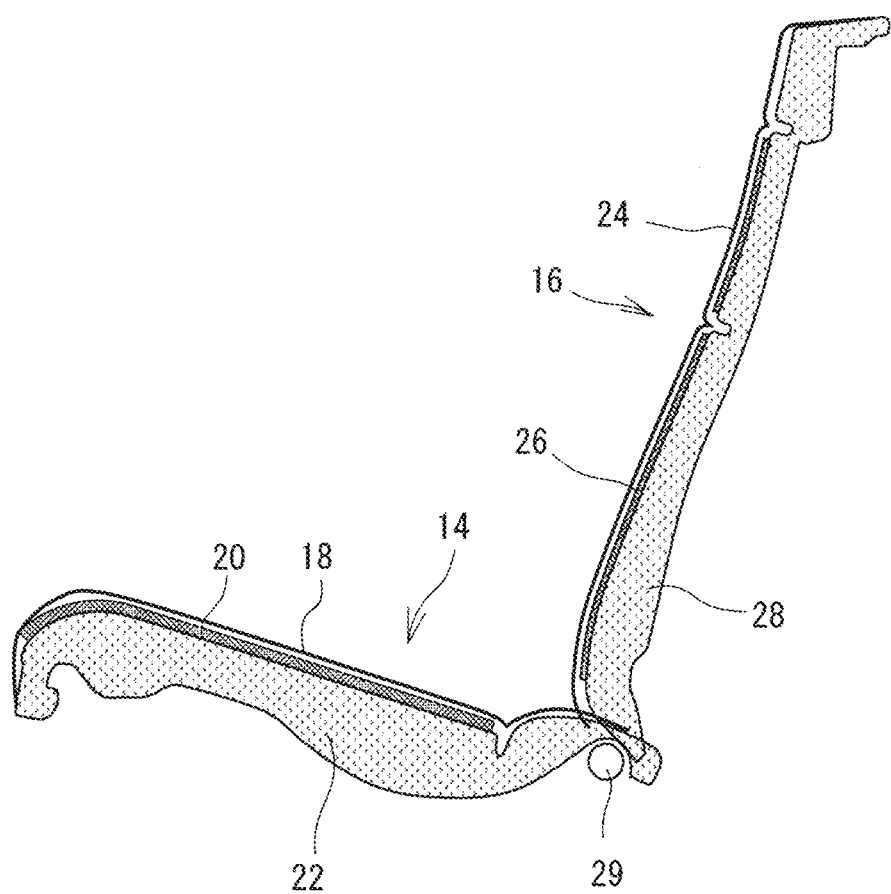
FIG. 2 is a sectional view of the seat.
Figure 3:
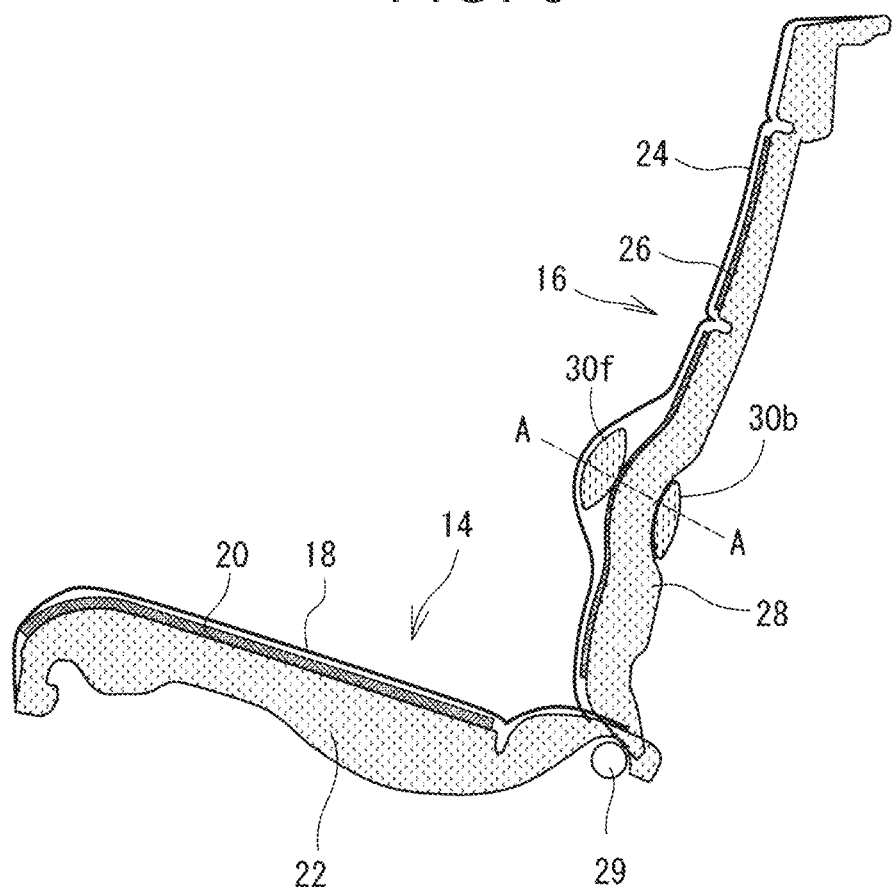
FIG. 3 is a sectional view of the seat in a state where stretch airbags are inflated.
Figure 4:
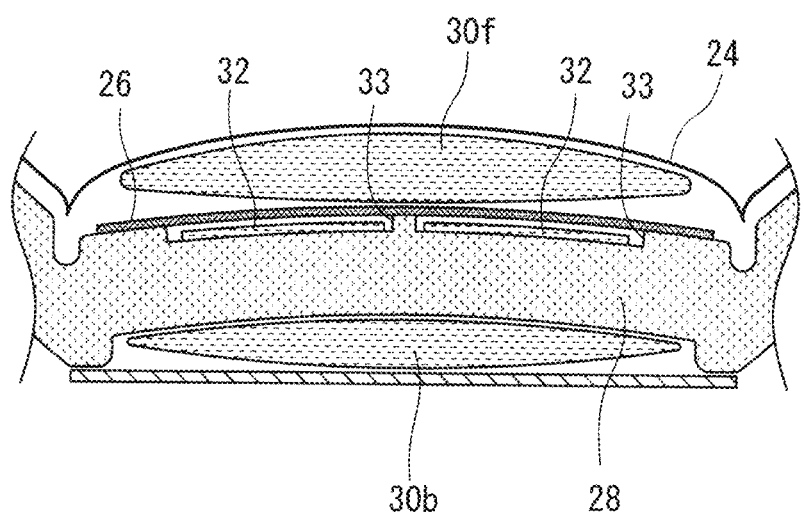
FIG. 4 is a sectional view taken along a line A-A in FIG. 3.

Further, FIG. 2 is a sectional view of the seat 12, and FIG. 3 is a sectional view at the time when stretch airbags 30f, 30b (described later) are inflated. Further, FIG. 4 is a sectional view taken along a line A-A in FIG. 3.

The seat device 10 is a seat device for one person and is used as a driver seat or a front passenger seat to be provided in a front part of a vehicle cabin. The seat 12 of the seat device 10 includes: a seat cushion 14 where a sitting person is seated; a seatback 16 configured to support the upper body of the sitting person; and a headrest 17 configured to support the head of the sitting person. The seat cushion 14 is configured such that a cushion pad 22 is put on a cushion frame (not shown) provided generally horizontally, and a surface of the cushion pad 22 is covered with a cushion cover 18. Further, a cover pad 20 made of a urethane foam slab or the like is disposed between the cushion pad 22 and the cushion cover 18. The cushion cover 18 is made of a thin sheet material, e.g., cloth, synthetic leather, natural leather, or the like. Several grooves are formed on a surface of the cushion cover 18. The grooves are formed by hanging (pulling) the cushion cover 18 from the cushion pad 22 side. The cushion pad 22 is made of a material having moderate elasticity, e.g., a soft polyurethane foam material or the like.

Slide rails (not shown) extending in the front-rear direction are fixed below the cushion frame. The cushion frame is slidably attached to the slide rails. When the cushion frame slides, the whole seat 12 can slide in the front-rear direction.

The seatback 16 includes: a back frame (not shown) rising from a rear end of the seat cushion 14; a seatback pad 28 placed on a front face of the back frame; and a seatback cover 24 covering a surface of the seatback pad 28. Further, a thin-sheet cover pad 26 made of a urethane foam material or the like is also provided between the seatback pad 28 and the seatback cover 24. The seatback pad 28 is made of a material having elasticity to such an extent that the seatback pad 28 is deformable along with inflation and deflation of airbags (described later), e.g., a soft polyurethane foam material or the like. The seatback cover 24 is also made of a thin sheet material, e.g., cloth, synthetic leather, natural leather, or the like, similarly to the cushion cover 18. Further, some grooves are also formed on a surface of the seatback cover 24. The grooves are formed by hanging (pulling) the seatback cover 24 from the seatback pad 28 side.

A bottom end of the back frame is connected to a swinging shaft 29 extending in the width direction. The seatback 16 including the back frame can swing (recline) in the front-rear direction around the swinging shaft 29. The headrest 17 configured to support the head of the sitting person is connected to an upper end of the seatback 16. The configuration of the headrest 17 can employ a conventional configuration, and therefore, the configuration of the headrest 17 is not described in detail herein.

In the seatback 16, a part corresponding to the lumbar part of the sitting person, more specifically, a part at a position slightly lower than an intermediate height of the seatback 16 is provided with a plurality of airbags. The airbags include relatively small refreshment airbags 32 and stretch airbags 30f, 30b. The airbags 32, 30f, 30b inflate when air is filled therein, and hereby, a surface of the seatback 16 locally projects toward a direction approaching the sitting person.

The refreshment airbags 32 inflate to refresh the sitting person. In the present embodiment, six refreshment airbags 32 are placed in an arrangement having three rows and two columns. Each of the refreshment airbags 32 is disposed between the seatback pad 28 and the cover pad 26 as illustrated in FIG. 4. When the refreshment airbags 32 repeatedly inflate and deflate in a predetermined cycle so that the surface of the seatback 16 locally advances and retreats in the predetermined cycle, the sitting person is caused to take a deep breath. Thus, the sitting person is refreshed.

The stretch airbags 30f, 30b are configured to cause the sitting person to stretch out the back. In the present embodiment, as the stretch airbags, a front-side stretch airbag 30f and a rear-side stretch airbag 30b are provided. Note that, in a case where the front-side stretch airbag 30f and the rear-side stretch airbag 30b are not distinguished from each other, subscript alphabets are omitted, and they are just referred to as the "stretch airbag 30." As apparent from FIG. 4, the front-side stretch airbag 30f is disposed between the seatback cover 24 and the cover pad 26, and the front-side stretch airbag 30f has a generally rectangular shape elongated in the width direction. The rear-side stretch airbag 30b is disposed on the rear side of the seatback pad 28 and at a position where the rear-side stretch airbag 30b overlaps the front-side stretch airbag 30f in the thickness direction. From another viewpoint, one stretch airbag 30 is provided on either side of the seatback pad 28 in the thickness direction. Note that, similarly to the front-side stretch airbag 30f, the rear-side stretch airbag 30b has a generally rectangular shape elongated in the width direction. As the stretch airbags 30 inflate so that the seatback 16 locally projects forward, the back of the sitting person is stretched out. Thus, a stretch effect is given to the sitting person. Note that, as apparent from FIGS. 1 and 4, the stretch airbags 30 are wider than the refreshment airbags 32, so that the stretch airbags 30 have a large capacity.

Figure 5:
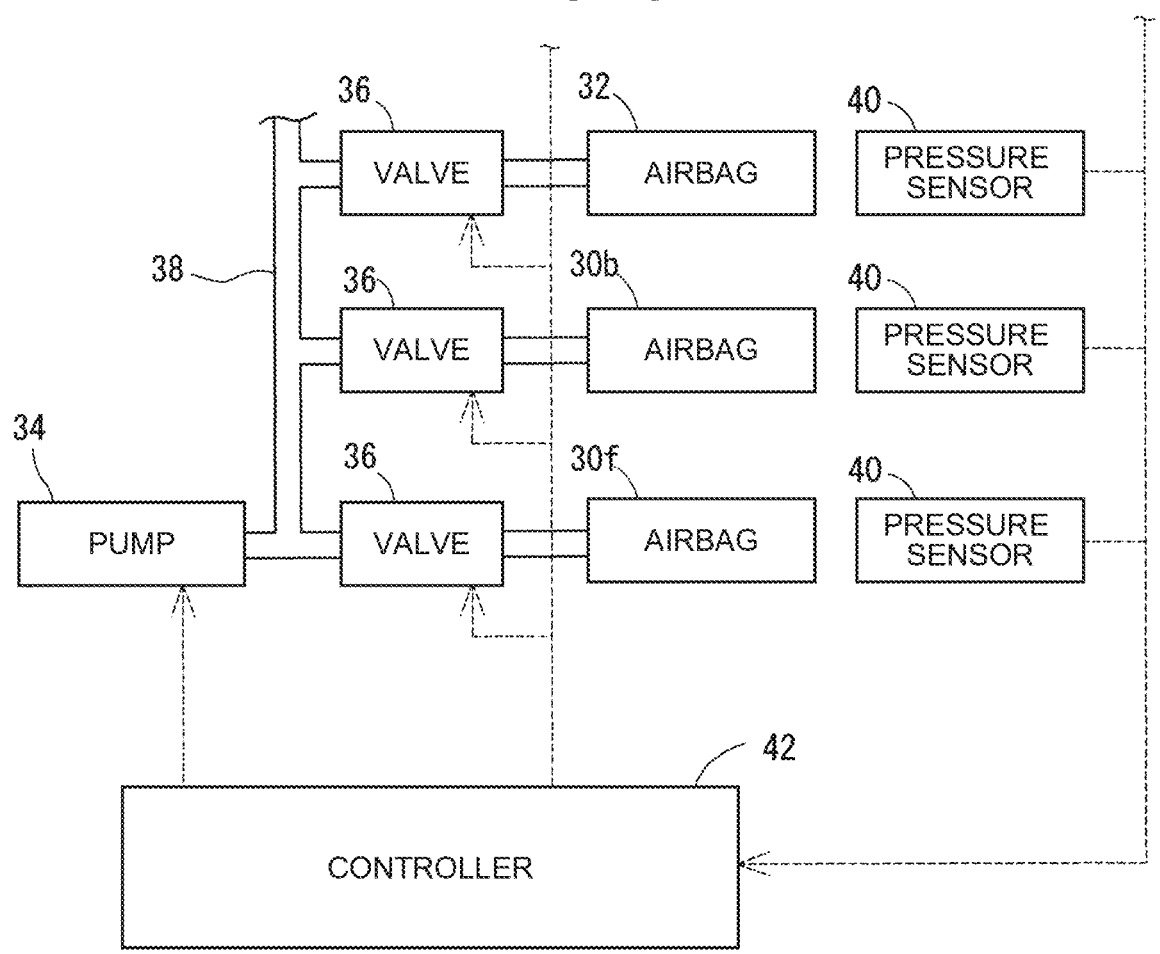
FIG. 5 is a block diagram related to an inflation-deflation control on the airbags.

FIG. 5 is a block diagram related to an inflation-deflation control on the airbags. As illustrated in FIG. 5 and also as described above, the seat device 10 is provided with the airbags 30f, 30b, 32. The airbags 30f, 30b, 32 communicate with a pump 34 via a tube 38. In accordance with instructions from a controller 42, the pump 34 supplies air to the airbags 30f, 30b, 32 or recovers the air from the airbags 30f, 30b, 32. A valve 36 such as an electromagnetic valve is provided between the pump 34 and each of the airbags 30f, 30b, 32. When the valves 36 open and close appropriately, an airbag to communicate with the pump 34 can be switched between the airbags 30f, 30b, 32.

The airbags 30f, 30b, 32 are provided with respective pressure sensors 40 configured to detect internal pressures of the airbags 30f, 30b, 32. Detection pressures detected by the pressure sensors 40 are transmitted to the controller 42. The controller 42 determines inflation amounts of the airbags 30f, 30b, 32 based on the detection pressures.

The controller 42 is a control device constituted by a microcomputer or the like including a CPU and a memory, for example. When it is determined that refreshment or stretch is required, the controller 42 opens the valve 36 of a corresponding one of the airbags 30f, 30b, 32, and the controller 42 drives the pump 34 so that the corresponding one of the airbags 30f, 30b, 32 inflates and deflates. More specifically, when refreshment is required, the controller 42 opens the valves 36 corresponding to the refreshment airbags 32. Further, in order that the refreshment airbags 32 inflate and deflate in a predetermined cycle, the controller 42 causes the pump 34 to repeat supply and recover of the air in the predetermined cycle in accordance with pressures detected by the pressure sensors 40.

Further, when stretch is required, the controller 42 opens the valves 36 corresponding to the stretch airbags 30. Also, the controller 42 causes the pump 34 to send the air to the stretch airbags 30 until the pressures detected by the pressure sensors 40 reach a predetermined target value. When the detection pressures reach the target value, the controller 42 closes the corresponding valves 36 and airtightly closes the stretch airbags 30. When two stretch airbags 30*f*, 30*b* both reach the target pressure to enter a completely inflated state, the controller 42 stops the driving of the pump 34. After that, when a given period of time (e.g., several seconds) elapses in that state, the controller 42 opens the valves 36 corresponding to the stretch airbags 30 again and drives the pump 34 so that the pump 34 recovers the air from the stretch airbags 30. When the stretch airbags 30 completely deflate and become flat, the stretch operation is ended.

Whether such refreshment and stretch operations are required or not may be determined based on an instruction from the sitting person or may be automatically determined by a superior control device or the controller 42 side. For example, the superior control device or the controller 42 may determine whether refreshment or stretch is required or not, based on a continuous riding time or the like. Further, a sensor configured to detect a state of the sitting person, e.g., a pulse sensor, a clinical thermometer, an optical sensor (a camera or the like) configured to detect the expression of the sitting person, and the like may be provided in the vehicle, and the superior control device or the controller 42 may determine whether refreshment or stretch is required or not, based on a detection result from these sensors.

Figure 6:
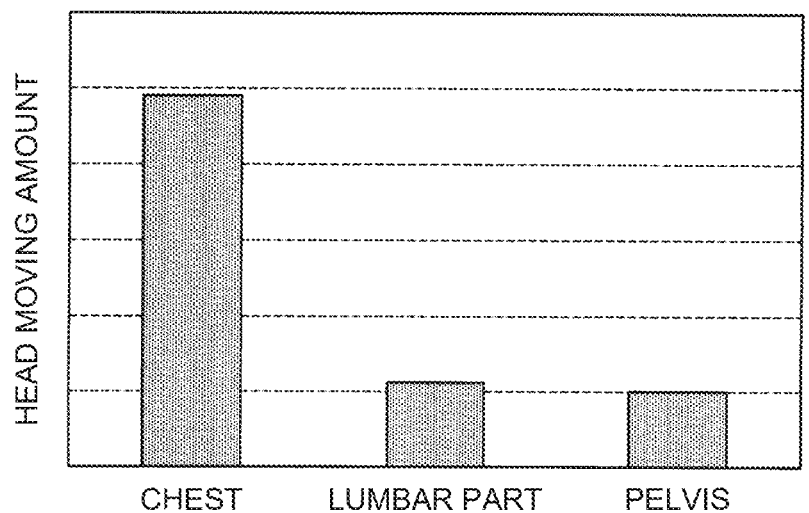
FIG. 6 is a graph illustrating a head moving amount for each pressing position.
Figure 7:
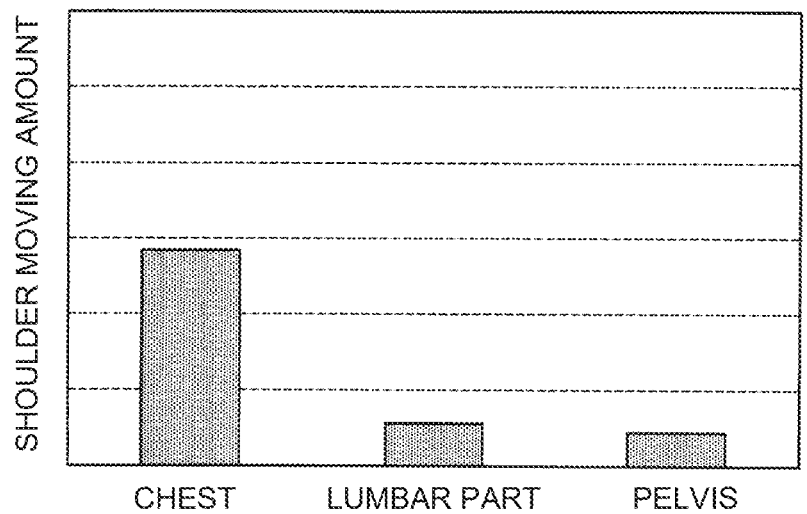
FIG. 7 is a graph illustrating a shoulder moving amount for each pressing position.

In the meantime, as apparent from the description made so far, in the present embodiment, the vicinity of the lumbar part of the sitting person is pressed by the seatback 16 so that the sitting person stretches. The reason why the vicinity of the lumbar part is pressed as such is to restrain the head or the shoulders of the sitting person from moving. This will be described with reference to FIGS. 6 and 7. FIG. 6 is a graph illustrating a head moving amount for each pressing position, and FIG. 7 is a graph illustrating a shoulder moving amount for each pressing position.

In order to cause the sitting person to stretch to improve bloodstream, it is effective to stretch out a muscle called longissimus muscle. The longissimus muscle is a large muscle extending from the vicinity of the neck root to the vicinity of the thighbones. Accordingly, in order to stretch out the longissimus muscle, it is effective to press the vicinity of the chest of the sitting person as well as the vicinity of the lumbar part of the sitting person. However, at the time when the sitting person is caused to stretch in a state where the sitting person is seated, it is desired to restrain the movement of the head or the shoulders of the sitting person as small as possible. Particularly, in a case where the sitting person is a driver, the movement of the head or the shoulders largely affects visibility or a handle operation. On this account, it is necessary to restrain the movement of the head or the shoulders as small as possible.

Here, as illustrated in FIG. 6, when the chest is pressed for stretch, the head greatly moves. Similarly, as illustrated in FIG. 7, when the chest is pressed, the shoulders greatly move. Meanwhile, when the vicinity of the lumbar part or the pelvis is pressed, the movement of the head and the shoulders can be restrained to be small. However, since the vicinity of the pelvis is placed near a bottom end of the longissimus muscle, it is difficult to obtain a sufficient stretch effect even when the vicinity of the pelvis is pressed. In view of this, in the present embodiment, in order to restrain the movement of the head and the shoulders and to obtain a sufficient stretch effect, the vicinity of the lumbar part is pressed.

In the meantime, the longissimus muscle described above is generally placed on the deep side from a surface of the back of a human body by about several centimeters. In order to press the longissimus muscle, the surface of the seatback 16 should be deformed more greatly than in the refreshment operation. In other words, in order to perform the stretch operation, a deformation stroke of the surface of the seatback 16 should be large. In the present embodiment, in order to secure a large deformation stroke, two stretch airbags 30*f*, 30*b* are placed to overlap each other in the thickness direction. With such a configuration, while the stretch airbags 30*f*, 30*b* are reduced in size and the time required for inflation is shorten, a large deformation stroke can be secured. This will be described with reference to FIGS. 8 and 9.

Figure 8:
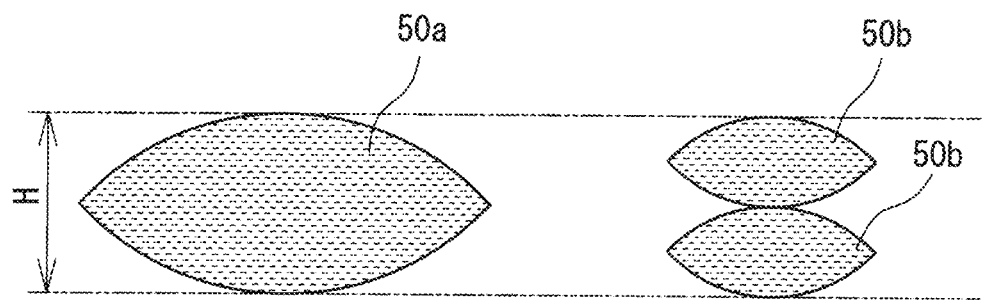
FIG. 8 is a schematic sectional view of inflated airbags.
Figure 9:
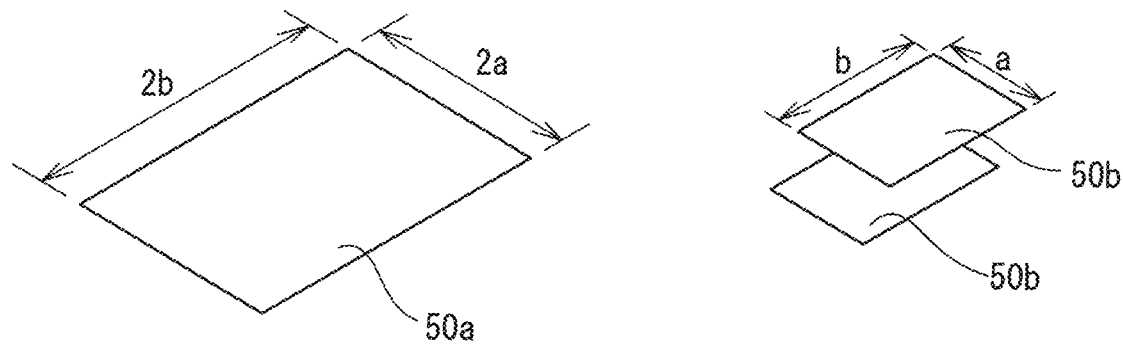
FIG. 9 is a view to describe respective dimensions of the airbags of FIG. 8.

FIG. 8 is a schematic sectional view at the time when given airbags 50*a*, 50*b* are inflated, and FIG. 9 is a view illustrating approximate sizes of the airbags 50*a*, 50*b*. As illustrated on the left sides in FIGS. 8 and 9, when the airbag 50*a* with a short side of 2*a* and a long side of 2*b* is inflated, the thickness of the airbag 50*a*, that is, the deformation stroke of the airbag 50*a* is H. In this case, in order to obtain the same thickness H, theoretically, two airbags 50*b* that are half the size of the airbag 50*a* should be placed one above the other in the thickness direction, as illustrated on the right sides in FIGS. 8, 9. That is, in a case where two airbags are placed to overlap each other, the size of the airbags necessary to obtain the same deformation stroke H can be reduced to half of the airbag 50*a*, so that a mounting space for the airbags can be restrained to be small.

Further, a maximum capacity of an airbag is generally represented by Formula 1 as follows. In Formula 1, A indicates a short side dimension of the airbag, and B indicates a long side dimension of the airbag. As apparent from Formula 1, when the dimension of the airbag is n times, the maximum capacity of the airbag is $n^3$ times. In other words, when the size of the airbag is ½, the air volume necessary to inflate the airbag, eventually, the air injecting time is reduced to ⅛. As a result, in a case where two airbags are placed to overlap each other, the air injecting time necessary to inflate the airbags can be largely reduced in comparison with a case where one airbag is placed.

$$V = 0.33 \times A \times B^2 - 0.11 \times A^3 \qquad \text{Formula 1}$$

As apparent from the above description, when two stretch airbags 30*f*, 30*b* are placed to overlap each other in the thickness direction like the present embodiment, a large deformation stroke can be secured, a mounting space for the airbags 30*f*, 30*b* can be reduced, and the air filling time can be reduced.

Note that, as described above, in the present embodiment, two stretch airbags 30*f*, 30*b* are provided respectively on both sides of the seatback pad 28 in the thickness direction. With such a configuration, it is possible to prevent friction between the two stretch airbags 30*f*, 30*b*, thereby making it possible to restrain deterioration of the stretch airbags 30*f*, 30*b*. Further, in the present embodiment, the front-side stretch airbag 30*f* is disposed on the front face side (at a position closer to the sitting person) from the refreshment airbags 32. This is to prevent the refreshment airbags 32 from being displaced after the stretch operation. That is, in a case where the refreshment airbags 32 are placed in front of the front-side stretch airbag 30*f* having a large inflation amount, the positions of the refreshment airbags 32 placed on a front face of the front-side stretch airbag 30*f* may be displaced along with inflation of the front-side stretch airbag 30*f*. When the positions of the refreshment airbags 32 are displaced, it is difficult to press an appropriate position at the time of the refreshment operation, thereby resulting in that a sufficient refresh effect cannot be obtained. In view of this, in the present embodiment, the front-side stretch airbag 30f is placed in front of the refreshment airbags 32. Further, in the present embodiment, in order to prevent displacement of the refreshment airbags 32 along with inflation of the rear-side stretch airbag 30b, recessed portions 33 in which the refreshment airbags 32 are accommodated are formed on the surface of the seatback pad 28, as illustrated in FIG. 4.

Note that the configuration described above is an example. The other configurations may be changed appropriately, provided that at least the stretch airbags 30 configured to locally press the surface of the seatback 16 are placed to overlap each other in the thickness direction with the seatback pad 28 being sandwiched therebetween. For example, in the above description, two stretch airbags 30 are placed to overlap each other, but three or more stretch airbags 30 may be placed to overlap each other. Further, the positions, the numbers, and the shapes of the stretch airbags 30 and the refreshment airbags 32 may be changed appropriately. Further, the stretch airbags 30 may be provided in other parts, e.g., a part corresponding to the shoulders, and the like, in addition to a part corresponding to the lumbar part. Accordingly, for example, in order to stretch out muscles around the shoulder blades of the sitting person, the stretch airbags 30 may be provided in parts indicated by reference signs 54 in FIG. 1. Even in this case, the stretch airbags 30 are placed to overlap each other in the thickness direction so as to sandwich the seatback pad 28 therebetween. With such a configuration, it is possible to stretch out the muscles around the shoulders, thereby making it possible to further improve comfortability for the sitting person. Further, the above description deals with the seat device to be provided in a vehicle as an example, but the technology disclosed in the present specification may be applied to other seat devices.

What is claimed is:

1. A seat device comprising:
   a seat cushion configured such that a sitting person is seated in the seat cushion; and
   a seatback configured to support an upper body of the sitting person, wherein:
   the seatback includes a seatback frame, a seatback pad placed on a front face of the seatback frame, and a seatback cover configured to cover a surface of the seatback pad;
   a plurality of stretch airbags is provided in a part of the seatback at a position corresponding to a lumbar part of the sitting person, the stretch airbags being configured to inflate and press a surface of the seatback to a direction approaching the sitting person; and
   the stretch airbags are placed to overlap each other in a thickness direction of the seatback such that the seatback pad is sandwiched between the stretch airbags, wherein:
   one or more refreshment airbags are further provided at the position corresponding to the lumbar part, the one or more refreshment airbags being smaller than the stretch airbags; and
   at least one of the stretch airbags is disposed on a front face side from the refreshment airbags.

2. The seat device according to claim 1, wherein the stretch airbags are further provided at positions corresponding to shoulders of the sitting person.

3. The seat device according to claim 1, wherein:
   the refreshment airbags are disposed between the seatback pad and a cover pad; and
   recessed portions in which the refreshment airbags are accommodated are formed on the surface of the seatback pad.

* * * * *